(12) United States Patent
Girelli Consolaro et al.

(10) Patent No.: US 9,162,546 B2
(45) Date of Patent: Oct. 20, 2015

(54) MULTILINK REAR AXLE FOR A MOTOR VEHICLE

(71) Applicant: FORD GLOBAL TECHNOLOGIES, LLC, Dearborn, MI (US)

(72) Inventors: Alberto Girelli Consolaro, Aachen (DE); Paul Zandbergen, Montzen (BE); Marc Simon, Köln (DE); Christoph Meier, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/293,511

(22) Filed: Jun. 2, 2014

(65) Prior Publication Data

US 2014/0353937 A1    Dec. 4, 2014

(30) Foreign Application Priority Data

Jun. 4, 2013  (DE) .......................... 10 2013 210 338

(51) Int. Cl.
*B60G 3/10* (2006.01)
*B60G 3/20* (2006.01)
(Continued)

(52) U.S. Cl.
CPC *B60G 3/202* (2013.01); *B60G 3/20* (2013.01);
*B60G 7/006* (2013.01); *B60G 11/02* (2013.01);
*B60G 11/04* (2013.01); *B60G 11/08* (2013.01);
*B60G 11/20* (2013.01); *B60G 11/22* (2013.01);
*B60G 21/051* (2013.01); *B60G 21/0551*
(2013.01); *B60G 2200/182* (2013.01); *B60G 2200/4622* (2013.01);

(Continued)

(58) Field of Classification Search
CPC .......... B60G 3/202; B60G 3/20; B60G 11/08;
B60G 11/02; B60G 11/04; B60G 11/22;
B60G 21/51; B60G 21/0551
See application file for complete search history.

(56) References Cited

U.S. PATENT DOCUMENTS 1,491,714 A * 4/1924 Lowe ............................ 267/271
1,509,618 A * 9/1924 Sorensen ........................ 267/45

(Continued)

FOREIGN PATENT DOCUMENTS

CN      102887042 A      1/2013
DE      3329686 A1       3/1985

(Continued)

OTHER PUBLICATIONS

Search Report issued by the Swedish Patent Office to the Turkish Patent Institute on Jun. 12, 2015, for co-pending Turkish Patent Application No. 2014/05856.

*Primary Examiner* — Faye M Fleming
(74) *Attorney, Agent, or Firm* — Jones Robb, PLLC; Raymond L. Coppiellie

(57) ABSTRACT

A multilink rear axle comprises a wheel carrier, a leaf spring, a first lower control arm, an upper control arm, and at least one member. The wheel carrier can rotatably support a wheel of the vehicle. The leaf spring can extend in a width direction of the vehicle that is transverse to a longitudinal direction of the vehicle. The first lower control arm can extend in the width direction and is pivotably coupled to the wheel carrier at a rear half thereof. The upper control arm can extend in the width direction and can be pivotably coupled to the wheel carrier at an attachment point that is offset from the rotation axis of the supported wheel in the longitudinal direction by less than or equal to 100 mm. The at least one member can pivotably couple the leaf spring to the upper control arm.

23 Claims, 11 Drawing Sheets

(51) Int. Cl.
*B60G 11/08* (2006.01)
*B60G 11/04* (2006.01)
*B60G 11/22* (2006.01)
*B60G 21/05* (2006.01)
*B60G 21/055* (2006.01)
*B60G 7/00* (2006.01)
*B60G 11/02* (2006.01)
*B60G 11/20* (2006.01)

(52) U.S. Cl.
CPC .... *B60G 2202/114* (2013.01); *B60G 2204/121* (2013.01); *B60G 2204/422* (2013.01); *B60G 2204/61* (2013.01); *B60G 2206/111* (2013.01)

(56) References Cited

U.S. PATENT DOCUMENTS

| | | | | |
|---|---|---|---|---|
| 1,546,711 | A * | 7/1925 | Brock | 267/244 |
| 2,018,653 | A | 10/1935 | Best | |
| 3,883,152 | A * | 5/1975 | De Carbon | 280/124.138 |
| 4,458,918 | A | 7/1984 | Rumpel | |
| 5,016,861 | A | 5/1991 | Thompson et al. | |
| 5,046,753 | A * | 9/1991 | Giovanni | 180/362 |
| 6,029,987 | A | 2/2000 | Hoffman et al. | |
| 6,357,772 | B1 | 3/2002 | Pelz et al. | |
| 6,457,729 | B2 | 10/2002 | Stenvall | |
| 6,588,779 | B2 | 7/2003 | Sandahl et al. | |
| 7,029,017 | B2 | 4/2006 | Zandbergen et al. | |
| 7,784,806 | B2 | 8/2010 | Schmidt et al. | |
| 8,267,416 | B2 | 9/2012 | Allen et al. | |
| 2002/0000703 | A1 | 1/2002 | Lawson et al. | |
| 2008/0290623 | A1 * | 11/2008 | Lundmark | 280/124.152 |

FOREIGN PATENT DOCUMENTS

| | | |
|---|---|---|
| DE | 19721878 A1 | 12/1998 |
| DE | 60119216 T2 | 2/2007 |
| DE | 10 2008 049 761 | 4/2010 |
| DE | 10 2011 076 359 | 11/2012 |
| DE | 10 2011 085 145 | 4/2013 |
| EP | 0083182 B1 | 7/1983 |
| EP | 1378382 B1 | 2/2002 |
| EP | 0963304 B1 | 9/2003 |
| EP | 1155882 B1 | 5/2006 |
| WO | WO 2011/124814 A1 | 10/2011 |

* cited by examiner

MULTILINK REAR AXLE FOR A MOTOR VEHICLE

CROSS REFERENCE TO RELATED APPLICATIONS

This application claims priority to German Application No. 10 2013 210338.7, filed on Jun. 4, 2013, the entire content of which is incorporated by reference herein.

TECHNICAL FIELD

The present disclosure relates generally to vehicle suspension systems, and more particularly, to a multilink rear axle for a motor vehicle.

BACKGROUND

FIGS. 1-2 show perspective and side views, respectfully, of a wheel suspension 100 of a multilink rear axle for a vehicle. Such a configuration is known as a trailing arm axle. Although only a single wheel suspension 100 is illustrated in FIGS. 1-2, normally a second wheel suspension would be arranged on the opposite side of the vehicle. The wheel suspensions on opposite sides of the vehicle (e.g., in a width direction of the vehicle) can be mirror images of each other.

Each wheel suspension 100 has two lower control arms 103 and 104, an upper control arm 105, and a trailing arm 106. The control arms 103, 104, and 105 are coupled to a wheel carrier or knuckle 107 and are capable of pivoting (e.g., rotating in a plane transverse to a longitudinal direction of the vehicle) about pivot points 112, 113 and 114 via respective bushings 109, 110, and 111. A wheel (not shown) can be attached to the wheel carrier 107 via bolts 108.

The three control arms 103, 104, and 105 extend parallel to each other and approximately parallel to the width direction of the vehicle, i.e., the vehicle horizontal (FH), and to wheel axis X-X. At respective ends opposite to the pivot points 112, 113, and 114, the control arms 103, 104, and 105 can be coupled to the vehicle body via respective bushings 115, 116, and 117 that allow the control arms to pivot (e.g., rotate in a plane transverse to the longitudinal direction of the vehicle).

A longitudinal suspension arm, or trailing arm, 106 is an elongated plate extending away from the wheel carrier 107, for example, along the longitudinal direction toward a front of the vehicle. The trailing arm 106 thus has low torsional resistance and allows for flexing or bending about the vertical axis. The trailing arm 106 is coupled at one end to the vehicle body via a bushing 118 and at an opposite end to the wheel carrier 107. The bushing 118 allows trailing arm 106 to pivot (e.g., rotate about the illustrated Y-axis). The trailing arm 106 acts to absorb forces in the vehicle longitudinal direction as well as control the trajectory of the rear wheel during spring element compression and extension of spring element 119.

A damper (not shown) and spring element 119, e.g., a coil spring, are provided to support the vehicle body or frame on the wheel suspension 100. A spring plate 120, which is formed as part of the rear lower control arm 104, holds the spring element 119. Because the cross-sectional profile of the rear lower control arm 104 is adapted to provide the spring plate 120, the lower control arm 104 has a relatively low stiffness. As a result, the vehicle driving performance, for example, its steering behavior and steering feel transmitted to the driver, may be adversely affected.

The spring plate 120 and spring element 119 are offset toward the rear of the vehicle (i.e. to the right in FIG. 2) with respect to a vertical line A-A running through the center Z of the wheel and with respect to the horizontal wheel axis X-X running through the center Z of the wheel. Consequently, vertical forces generated by spring element 119 (spring force=$F_S$) that act on the wheel suspension 100 via the spring plate 120 and vertical contact forces acting on the wheel body (wheel force=$F_W$) that are transmitted to wheel carrier 107 along line A-A are offset from each other, e.g., by offset 151, as shown in FIG. 2. This causes a vertical force or preload ($F_{TB}$) on the body-side bushing 118 of the trailing arm 106, which may negatively affect the service life of the body-side bushing 118.

For stabilization, an anti-roll bar 121 is used to provide a rigid connection between the wheel suspensions on opposite sides of the vehicle. The anti-roll bar 121 extends parallel to the vehicle horizontal FH and is attached at its ends to the lower rear control arms 104 via a respective pendulum arm. The anti-roll bar 21 can be attached via symmetrically arranged brackets 136 to the vehicle body or a frame connected to the vehicle body. For example, brackets 136 (of which only the left bracket is shown in FIG. 1) can take the form of a clip adapted to the cross-section of the anti-roll bar 121.

In the multilink axle illustrated in FIGS. 1-2, the use of the anti-roll bar, spring elements, fixing elements, and support points, such as the spring plate on the lower control arm, results in a heavier rear axle in addition to the other disadvantages noted above.

With this in mind, the object of the present disclosure is to provide a rear wheel axle which offers the dynamic driving properties of a structurally complex multilink rear wheel suspension, but which has increased durability and is less susceptible to material wear as compared to the above described trailing arm axle. Furthermore, the object of the present disclosure is to provide a lighter and more compact rear axle which has improved, or at least equivalent, dynamic driving properties.

SUMMARY

In accordance with various exemplary embodiments, the present disclosure provides a multilink rear axle comprising a leaf spring and first and second wheel suspensions. The first and second wheel suspensions are arranged on opposite sides of a vehicle. Each wheel suspension comprises a wheel carrier configured to support a wheel of the vehicle thereon. The leaf spring extends in a width direction of the vehicle transverse to a longitudinal direction of the vehicle and is coupled to the first and second wheel suspensions. Each of the wheel suspensions further comprises a first lower control arm, an upper control arm, and a trailing arm. The control arms and the trailing arm are each arranged with respective ends on the wheel carrier. The leaf spring is arranged below each upper control arm. At least one vertically extending strut couples the leaf spring to each upper control arm.

In accordance with various exemplary embodiments, the present disclosure further provides a multilink rear axle comprising a wheel carrier, a leaf spring, a first lower control arm, an upper control arm, and at least one member. The wheel carrier is for rotatably supporting a wheel of the vehicle. The supported wheel can have a rotation axis. The leaf spring extends in a width direction of the vehicle that is transverse to a longitudinal direction of the vehicle. The first lower control arm extends in the width direction and is pivotably coupled to the wheel carrier at a rear half thereof. The upper control arm extends in the width direction and is pivotably coupled to the wheel carrier at an attachment point that is offset from the rotation axis in the longitudinal direction by less than or equal to 100 mm. The at least one member pivotably couples the leaf spring to the upper control arm.

In accordance with various exemplary embodiments, the present disclosure further provides a trailing arm rear axle comprising a wheel carrier, an upper control arm, a front lower control arm, a rear lower control arm, a trailing arm, and a spring element. The upper control arm is coupled to a top portion of the wheel carrier. The front lower control arm is coupled to a front, bottom portion of the wheel carrier, and the rear lower control arm is coupled to a rear, bottom portion of the wheel carrier. The trailing arm is coupled to a front portion of the wheel carrier. The spring element is coupled at an end thereof to the upper control arm.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
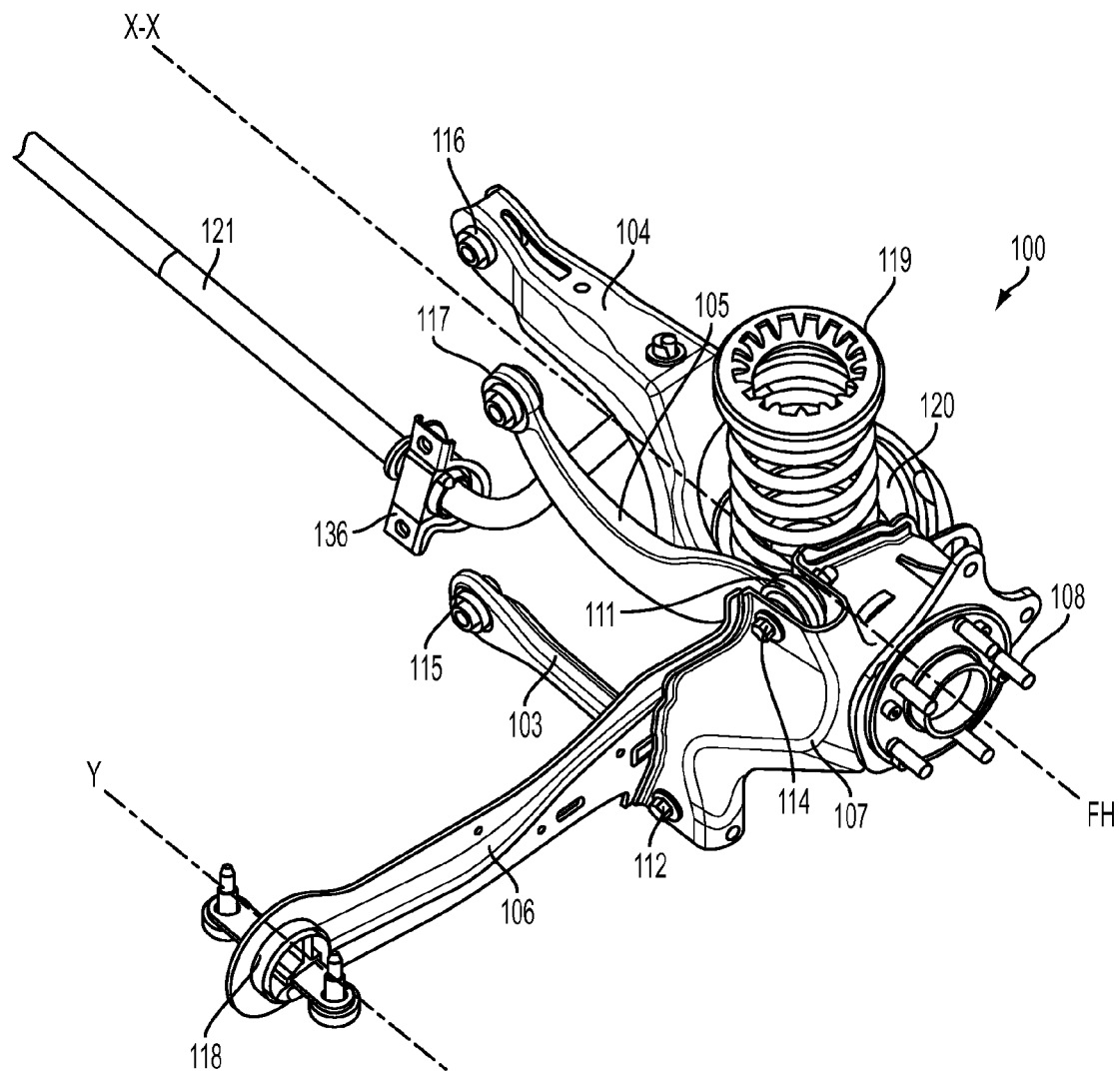
FIGS. 1-2 are perspective and side views, respectively, of a wheel suspension of a multilink axle according to the prior art.
Figure 2:
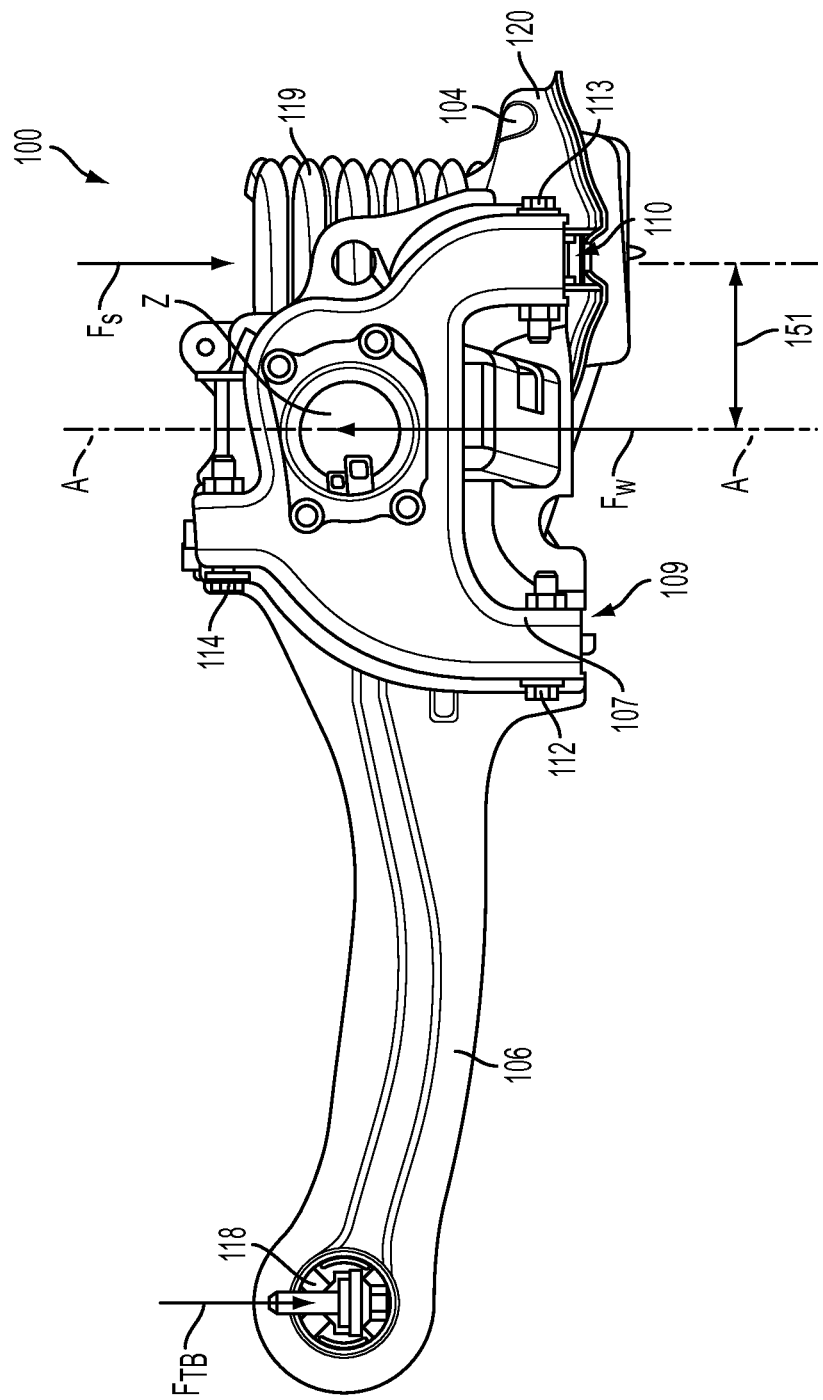

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

As used herein, the term "body-side pivoting" refers to the coupling or rotatable mounting of an arm (e.g., control arm or trailing arm) on the vehicle body (or frame/subframe thereof), such that the arm can pivot or rotate about the mounting point.

As used herein, the term "body-side bushing" refers to bushings which may be formed at an end of an arm (e.g., control arm or trailing arm) or in a respective portion of the vehicle body (or frame/subframe thereof) for body-side pivoting of the arm.

As used herein, the term "wheel-carrier-side pivoting" refers to the coupling or rotatable mounting of an arm (e.g., control arm or trailing arm) or leaf spring on the wheel carrier, such that the arm can pivot or rotate about the mounting point.

As used herein, the term "wheel-carrier-side bushing" refers to bushing which may be formed at an end of an arm (e.g., the control arm or trailing arm) or the leaf spring, or in a respective portion of the wheel carrier, for wheel-carrier-side pivoting of the arm or leaf spring.

As used herein, the term "frame" refers to a vehicle frame, subframe, assembly carrier, or portion of the vehicle underbody that is connected to or forms a part of the vehicle body or the vehicle superstructure.

As used herein, the term "wheel axis X-X" refers to the axis running through the center Z of the axle carrier.

In accordance with the present teachings, one or more exemplary embodiments of a multilink rear axle for a vehicle, in particular for a motor vehicle, can comprise wheel suspensions on opposite sides of the vehicle (e.g., a passenger-side and a driver-side). Each wheel suspension can comprise at least one lower control arm (e.g., a front lower control arm and/or a rear lower control arm), an upper control arm, and a trailing arm. Each of the upper and lower control arms and the trailing arm can be arranged with an end thereof on a wheel carrier or knuckle.

The multilink rear axle can also comprise a leaf spring that is arranged along a width direction of the vehicle, i.e., transverse to a longitudinal direction of the vehicle (e.g., the longitudinal direction may be parallel to a direction of travel of the vehicle). The leaf spring can be arranged below the upper control arm of each wheel suspension. One or more suspension arm elements can be arranged at respective ends of the leaf spring and can couple the leaf spring to the wheel carrier. For example, the leaf spring can be rotatably coupled to the upper control arm of each wheel suspension via the respective suspension arm element. Thus, coupling of the leaf spring to the wheel carrier can be provided via the upper control arm, which itself can be rotatably coupled to the wheel carrier via a bushing.

For example, the upper control arm can be coupled to a region of the wheel carrier that has a center line coplanar with (in a plane perpendicular to the longitudinal direction of the vehicle) or at least proximal to (in a longitudinal direction of the vehicle) a center line of the wheel carrier (e.g., a rotational axis X-X of the wheel attached to the wheel carrier). With the leaf spring connected to the upper control arm via the one or more suspension arm elements, forces generated by the leaf spring can be conveyed to the wheel carrier via the upper control arm at a substantially central location.

For example, forces generated by the leaf spring (spring force=$F_s$) and the contact forces on the wheel body (wheel force=$F_w$) can be substantially aligned and opposed to each other in the vertical direction (i.e., along lines with little or no offset in the longitudinal direction), thereby avoiding or at least reducing the vertical pre-load acting on the bushing of the trailing arm attached to the vehicle body. Accordingly, the durability (i.e., the fatigue life) of the body-side bushing of the longitudinal suspension arm can be increased, and the overall noise, vibration, and harshness (NVH) behavior of the rear axle can be improved.

The leaf spring can provide the functions of an anti-roll bar and the coil spring in conventional multilink axle designs. By eliminating these components of the conventional design through the use of the leaf spring, embodiments of the disclosed subject matter can realize significant reductions in weight.

In the multilink axle illustrated in FIG. 1, the distance between the wheel center and the anti-roll bar connection on the lower control arm acts disadvantageously in the Y-direction, i.e., almost in the transverse direction of the vehicle. In contrast, this distance can be substantially reduced in embodiments of the disclosed subject matter by employing a leaf spring, since the suspension arm elements can be connected further out (e.g., further out from a center of the vehicle and thus closer to the wheel carrier) than the conventional anti-roll bar due to the lack of any coil spring. This leads to greater stability of the multilink rear axle while taking up less space and weighing less.

In one or more exemplary embodiments, roll stabilization is improved by connecting the leaf spring to the upper control arm which has a relatively high bending stiffness. In contrast, the anti-roll bar of the conventional multilink axle is connected to the lower control arm, which has a lower bending stiffness. The leaf spring can also be arranged so as to experience only bending stress, not torsion and bending as with conventional anti-roll bars. This can further improve the effectiveness of the disclosed multilink axle.

Because the leaf spring replaces the spring/strut elements of the multilink axle of FIG. 1, the design of the lower control arms can be simplified, and a body-side spring strut bearing and spring turret in the vehicle body or frame can also be eliminated, which saves additional space that can be repurposed, for example, to increase vehicle trunk or storage space. For example, the rear lower control arm can be formed without a spring plate to support a spring element and/or strut. As a result, the rear lower control arm may be designed to have increased stiffness in combination with reduced weight. For example, the rear lower control arm can have a cross-section that is polygonal (e.g., square or rectangular) or round, along a major portion of its length, or at least along a portion proximal to the wheel carrier. Such a design for the lower control arm may drastically reduce the manufacturing costs as compared to the more complex design of a control arm with spring plate. The cross-section of the rear lower control arm may be substantially constant over the major portion of its length, or vary progressively or intermittently over its length.

For example, the leaf spring can be made from steel that has the desired spring and material properties. In such a configuration, the leaf spring can be a flexible bar and can comprise one or more superimposed material layers connected or held together. Alternatively or additionally, the leaf spring can comprise composite material, such as, but not limited to, carbon, glass fibers or a para-aramid synthetic fiber (e.g., Kevlar), which may result in increased weight reductions. Materials for the leaf spring are not limited to those specifically recited above, and other materials for the leaf spring are also possible according to one or more contemplated embodiments.

In one or more exemplary embodiments, the leaf spring can be formed to have a non-linear shape or profile in order to avoid certain structures of the vehicle, such as, but not limited to, a bottom of the vehicle trunk, spare tire storage area, exhaust pipe, or other suspension component. During suspension compression and extension, a middle point of the leaf spring displaces vertically (i.e., upward or downward), and this movement toward or away from the vehicle structure can be taken into account in the design of the profile of the leaf spring in order to provide a minimum clearance between the leaf spring and the vehicle structures.

In one or more exemplary embodiments, the wheel suspension can have at least two lower control arms. For example, a first lower control arm (e.g., a front lower control arm) can be coupled to the wheel carrier at a front half thereof (e.g., at a segment of the wheel carrier that is spaced toward the front of the vehicle with respect to a center axis of the wheel carrier), and a second lower control arm (e.g., a rear control arm) can be coupled to the wheel carrier at a rear half thereof (e.g., at a segment of the wheel carrier that is spaced toward the rear of the vehicle with respect to the center axis of the wheel carrier).

In one or more exemplary embodiments, the front lower control arm can be coupled to a wheel carrier via an adjustable-length actuator. The adjustable-length actuator can extend in a direction of the vehicle width (i.e., transverse to the direction of travel) and substantially parallel to the rotational axis of the wheel carrier. As a result, the wheel carrier can be supported by the front lower control arm and the actuator against twisting. Alternatively or additionally, the front lower control arm can include an adjustable length portion. In such configurations, a steering angle or toe setting of the wheel carrier can be adjusted via a change in length of the adjustable-length actuator and/or the adjustable portion of the front lower control arm. Alternatively or additionally, the front lower control arm can be a compensation arm, a track arm, or an integral suspension arm that is pivoted on the body side on the vehicle body, a frame or subframe.

In one or more exemplary embodiments, the trailing arm can be integrally formed with the wheel carrier. Since the trailing arm is integral with the wheel carrier, mating surfaces for attaching the trailing arm to the wheel carrier as well as associated connecting elements can be avoided, thereby further reducing the weight of the multilink axle. The trailing arm can comprise a blade-like plate with low torsional stiffness that extends from the main body of the wheel carrier in a longitudinal direction of the vehicle. The trailing arm can be coupled to the vehicle body (or a frame/subframe thereof) by a bushing, which allows the trailing arm to pivot about the connection (e.g., rotate about the illustrated Y-axis).

In one or more exemplary embodiments, the trailing arm can be formed as a separate component and attached to the wheel carrier during assembly of the multilink axle, for example, by one or more connecting elements (e.g., bolts, rivets, etc.) or by press fitting. In such instances, the trailing arm and the wheel carrier may be formed from the same or different materials. The trailing arm can comprise a blade-like plate with low torsional stiffness that is rigidly or fixedly coupled to the wheel carrier. For example, the wheel carrier and/or the trailing arm can include corresponding mating surfaces for making the rigid or fixed connection. The trailing arm extends in a longitudinal direction of the vehicle and can be coupled to the vehicle body (or a frame/subframe thereof)

by a bushing, which allows the trailing arm to pivot about the connection (e.g., rotate about the illustrated Y-axis).

In one or more exemplary embodiments, the upper and lower control arms can be coupled to the vehicle body (or a frame/subframe thereof) at an end distal from the wheel carrier so as to pivot about the respective connection (e.g., rotate about the coupling in a plane transverse to the longitudinal direction of the vehicle). At an opposite end that is proximal to the wheel carrier, the upper and lower control arms can be coupled to the wheel carrier so as to pivot about the respective connection (e.g., rotate in a plane transverse to the longitudinal direction of the vehicle).

In one or more exemplary embodiments, the leaf spring can be coupled to the upper control arm. For example, the leaf spring can be coupled to the upper control arm via one or more suspension arms. Bushings can couple the one or more suspension arms to the upper control arm and the leaf spring to the suspension arms, thereby allowing the leaf spring to pivot (e.g., rotate about the bushing in a plane transverse to the longitudinal direction of the vehicle). Alternatively or additionally, bushings and associated pivots points can be replaced with different coupling mechanisms, such as, but not limited to ball joints and corresponding bearings, ball bearings, a combination of bushings and ball joints, or any other type of bearing or rotational coupling. As a result, transverse forces can be absorbed by the control arms and their respective bushings. In contrast, the leaf spring primarily reacts to bending forces, i.e., vertical forces on the leaf spring acting either up toward the vehicle underside or down toward the ground.

In one or more exemplary embodiments, the leaf spring can be mounted in two bearing seats connected to the vehicle body (or frame/subframe thereof). For example, the bearing seats can comprise clamping elements (e.g., a U-shaped clamping element) that provides a damping effect with respect to a middle portion of the leaf spring. The bearing seats can be adapted to the cross section of the leaf spring. Alternatively or additionally, the bearing seats can comprise clamping elements made of an elastomer material. These elastomer-comprising clamping elements can be held on bracket parts of a vehicle frame and allowed to oscillate.

In one or more exemplary embodiments, the bearing seats are separately adjustable with respect to their location along the leaf spring. As a result, the vibration axis of the middle portion of the leaf spring, which is defined by the arrangement of the bearing seats, can be adjusted by moving the bearing seats along the leaf spring. Thus, stiffness or pre-tension of the leaf spring can be adjusted.

The vertical compression and extension movement of the leaf spring may be dependent on its stiffness and/or pre-tension, in addition to the material properties of the leaf spring. Accordingly, the ability to vary the location bearing seats and to thereby adjust the behavior of the leaf spring allows the multilink axle to be customized for desired driving performance and/or type of vehicle. Alternatively or additionally, one or more actuators can dynamically reposition the bearing seats along the leaf spring, for example, to adjust the behavior of the vehicle to different driving situations. Alternatively or additionally, the leaf spring's stiffness can be altered by changing the material from which it is formed or by altering its dimensions, e.g., its thickness (i.e., in a vertical direction of the vehicle) and/or its width (i.e., in a horizontal direction parallel to the longitudinal direction of the vehicle).

In one or more embodiments, the bearing seats can be integrally formed with the vehicle body (or frame/subframe). Alternatively, the bearing seats can be separately formed and later coupled to the vehicle body (or frame/subframe), for example, via a connection element, such as a rivet, peg, screw, or bolt, or via welding or press fit. Other connection mechanisms are also possible according to one or more contemplated embodiments.

In one or more embodiments, the leaf spring can be arranged to have a substantially C-shape or U-shape as viewed from a direction parallel to the longitudinal axis of the vehicle. Thus, the leaf spring can have a profile with a minimum or a maximum (e.g., a vertex) in a middle portion thereof between the bearing seats in the width direction of the vehicle. Such an arrangement may be made on initial installation, i.e., with the vehicle at rest and without external forces acting on the vehicle. Alternatively, the leaf spring may adopt a U-shape configuration when subjected to a vertical compression movement (i.e., both wheels of the vehicle are subject to the same vertical movement or loading), whereas the leaf spring may have a substantially flat orientation prior to or upon initial installation.

During rolling movements of the vehicle (e.g., when cornering), centrifugal forces tend to move the vehicle outward. The resulting roll angle depends on the transverse acceleration, the vehicle mass, the height of the center of gravity, and the vehicle superstructure. Because of the kinematics of the wheel suspension, the position of the roll axis and the roll center are influenced by the forces acting on the vehicle. On rolling movements of the vehicle, the leaf spring may be configured to change profiles from the initial shape. For example, during roll of the vehicle, the leaf spring profile may assume a rotated S-shape or a sinusoidal shape. The size of the S-shape profile of the leaf spring (e.g., the amount of the deviation from the normal configuration) in response to rolling movement of the vehicle can be adjusted by virtue of the position of the bearing seats along the length of the leaf spring. The middle portion and outer end regions of the leaf spring are allowed to move in a vertical direction relative to the two bearing seats, wherein the end regions follow the suspension compression and extension movements (asymmetrically) to form the rotated S-shape.

Figure 7:
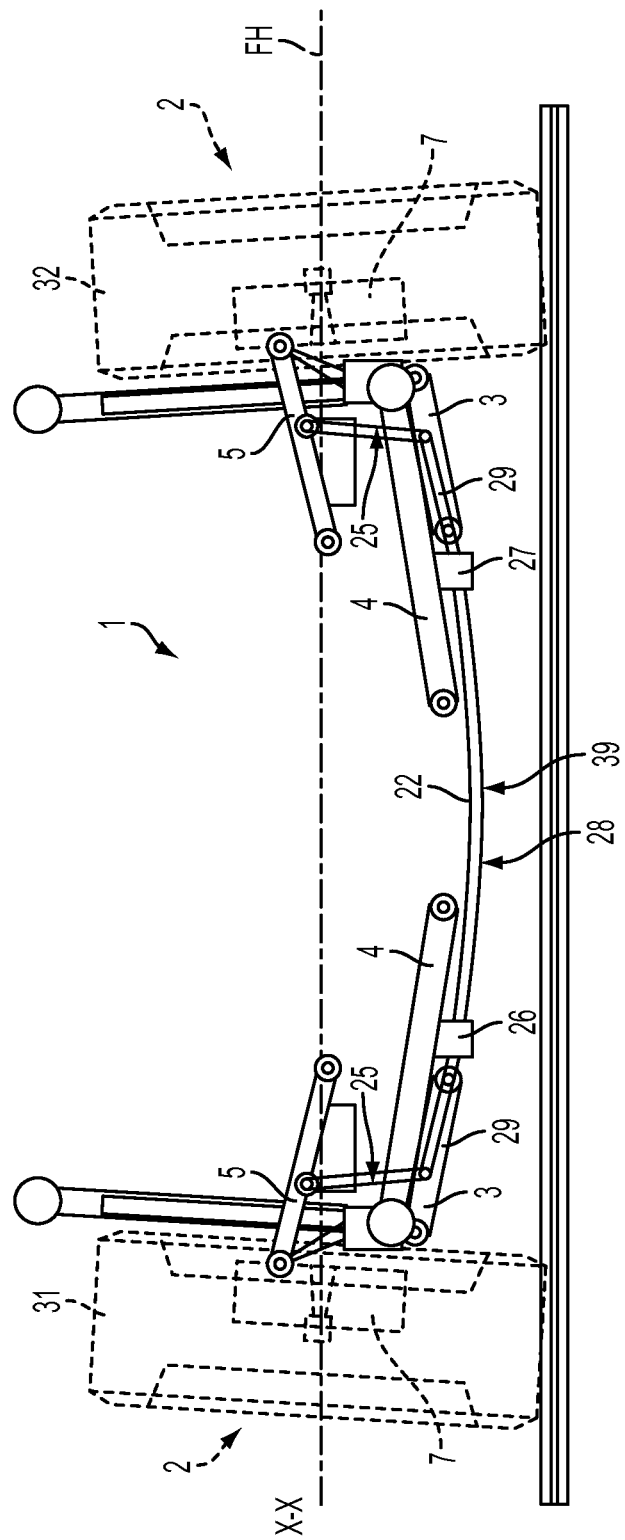
FIGS. 7-8 depict a configuration of the multilink rear axle according to one or more embodiments of the disclosed subject matter during vertical and rolling motion, respectively, as viewed from the rear of the vehicle.
Figure 8:
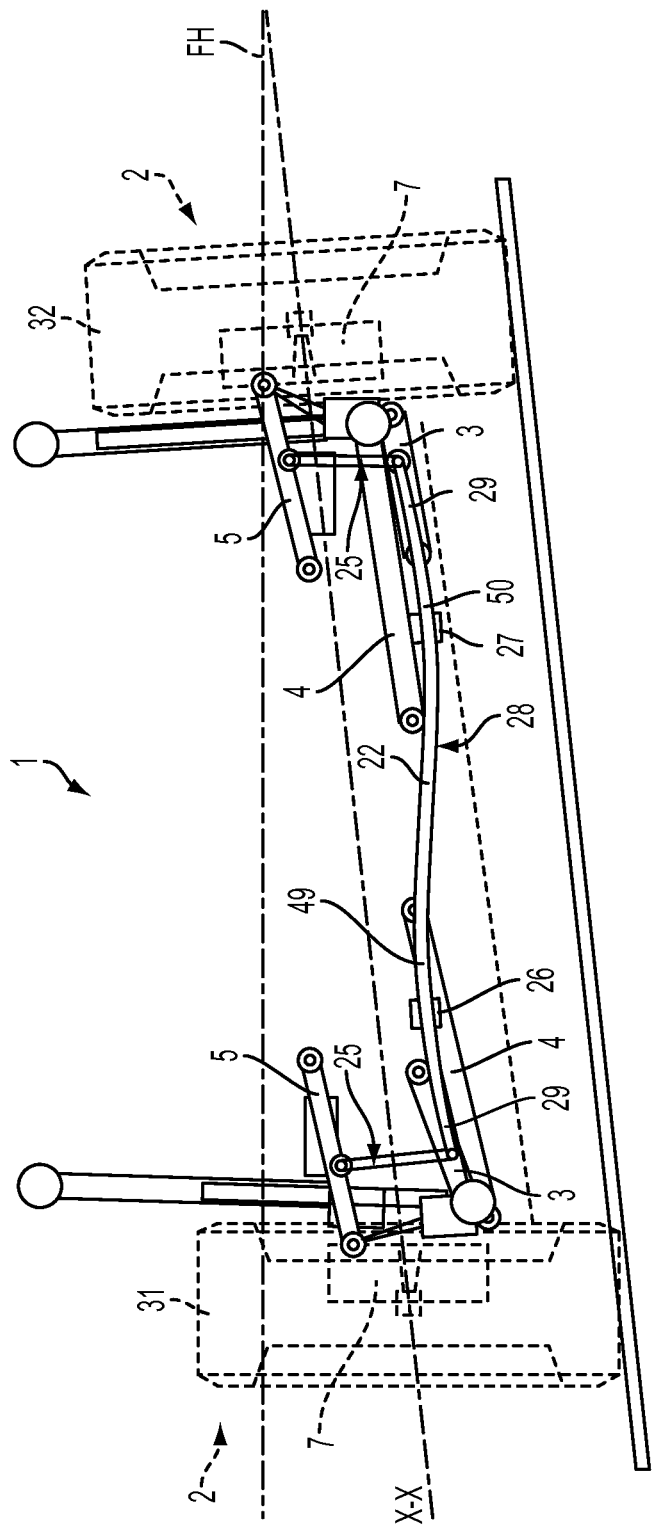
Figure 9:
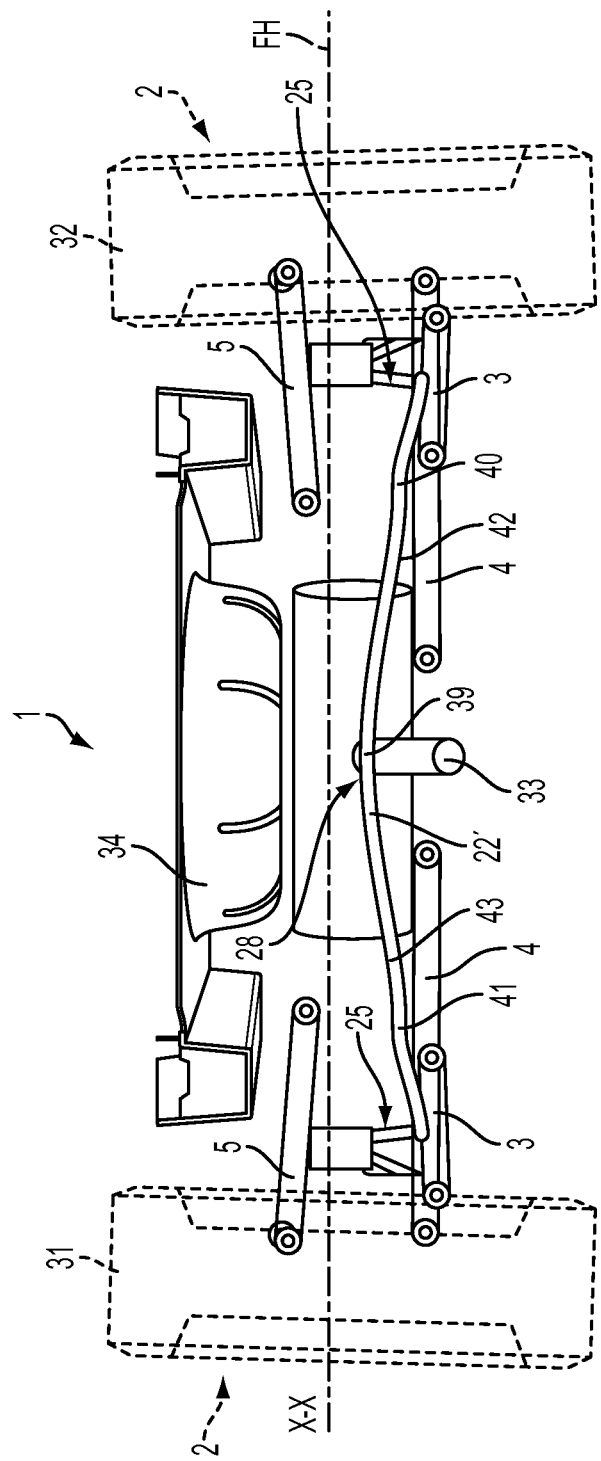
FIG. 9 depicts another multilink rear axle with a modified leaf spring according to one or more embodiments of the disclosed subject matter, as viewed from the rear of the vehicle.

Departures from the ideal disclosed shapes, e.g., the U-shape and the sinusoidal shape, are also possible according to one or more contemplated embodiments. Indeed, practical embodiments would not necessarily conform exactly to a perfect mathematical curve, but may exhibit the overall general profile suggested by the recited shapes. For example, the leaf spring may exhibit a single, substantially central maximum along its profile, such as shown in FIG. 9, when in the U-shaped configuration even if the shape does not exactly conform to a perfect U-shape. In another example, the leaf spring may exhibit a single, substantially central minimum along its profile, such as shown in FIG. 7, when in the U-shaped configuration, even if the shape does not exactly conform to a perfect U-shape. In still another example, the leaf spring may exhibit at least one maximum and at least one minimum along its profile, such as shown in FIG. 8, when in the sinusoidal configuration even if the shape does not exactly conform to a perfect sine-wave.

In one or more embodiments, the multilink rear axle can result in good driving dynamic properties of the vehicle while achieving a space-saving, compact construction. Durability of components, e.g., the body-side bushing of the trailing arm, also can be improved by eliminating or at least reducing the offset between the spring force (e.g., force $F_S$ generated by the leaf spring) and the contact force on the wheel body ($F_W$). The vertical preload ($F_{TB}$) on the body-side bushing of the trailing arm can thus be eliminated or at least reduced. Depending on the arrangement of the leaf spring and the upper control arm with respect to the wheel carrier, it may be possible to achieve an offset between zero and a few tens of millimeters, although minimizing or eliminating the offset may be desirable in terms of reducing the magnitude of the vertical preload. For example, the offset can be less than 100 mm, such as within the range from 0 to 10 mm, inclusive.

Figure 3:
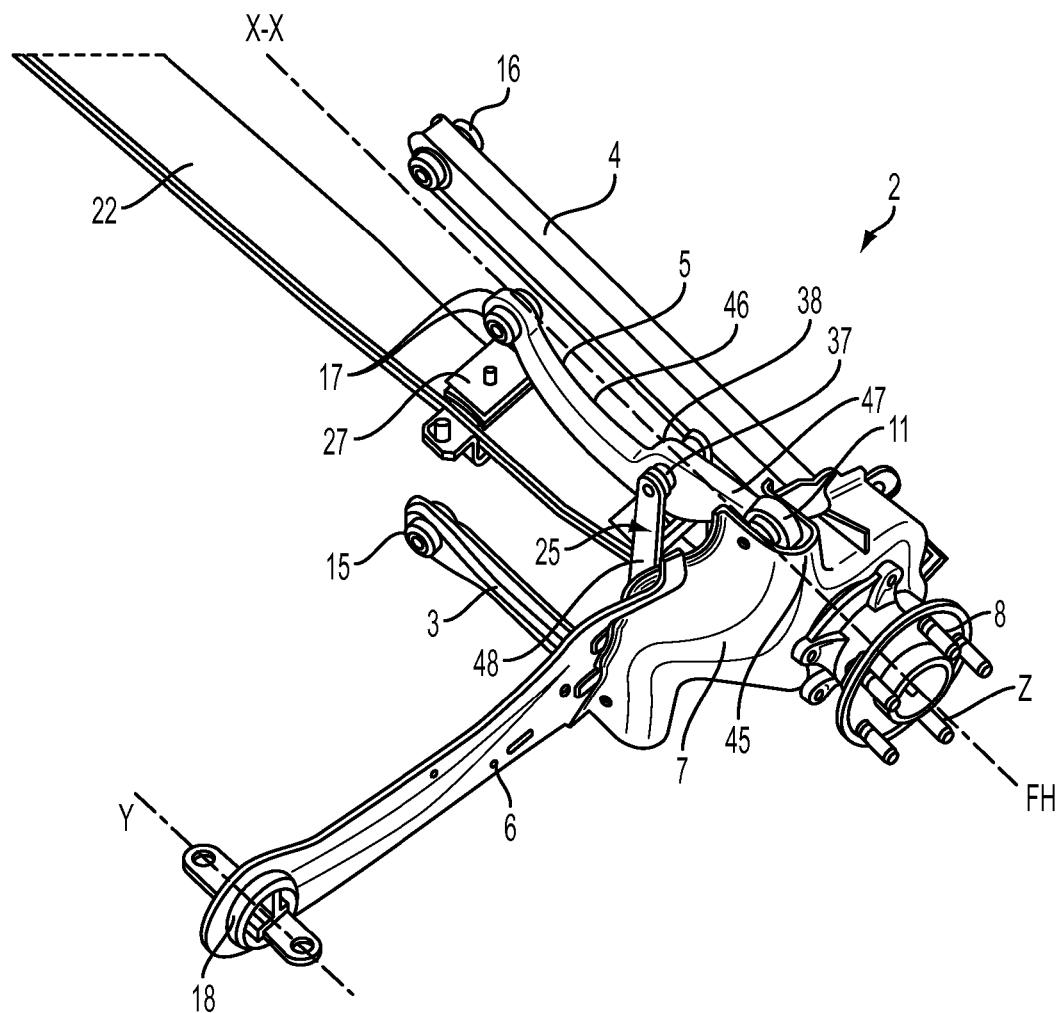
FIGS. 3-4 are perspective and side views, respectively, of a wheel suspension of a multilink axle according to one or more embodiments of the disclosed subject matter.
Figure 4:
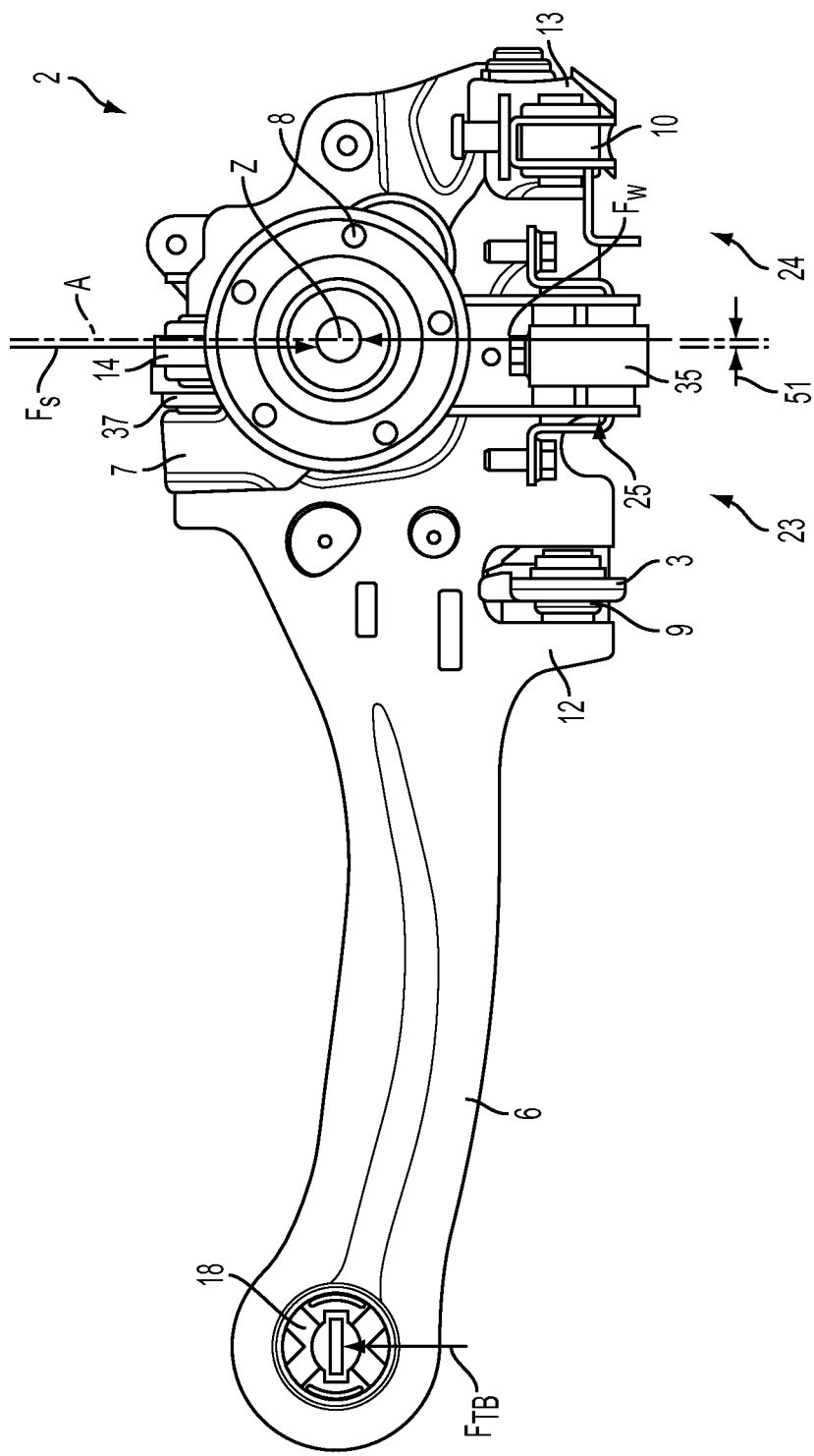
Figure 5:
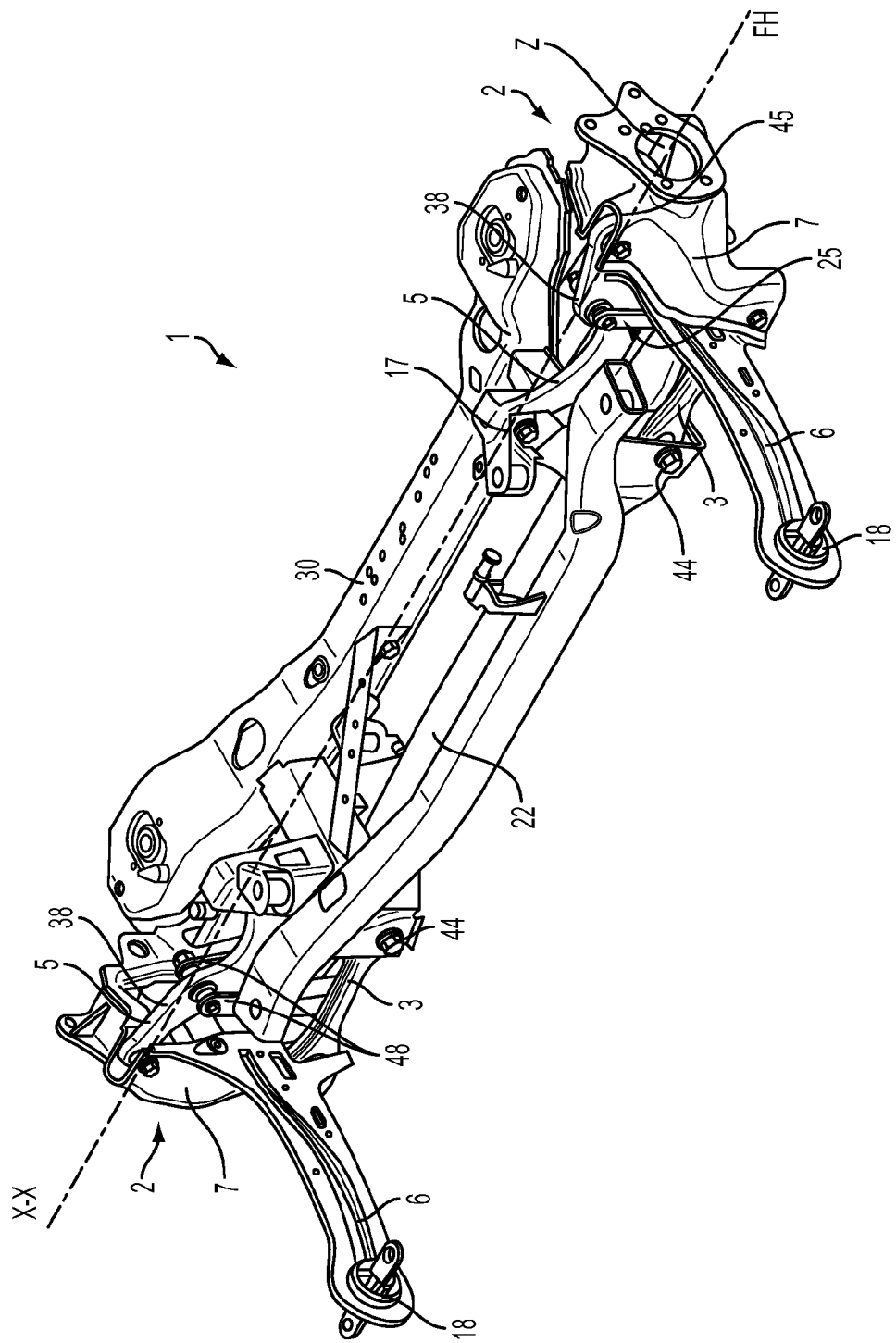
FIGS. 5-6 are body-side perspective and underside perspective views, respectively, of left and right wheel suspensions of a multilink axle with respect to other elements of a vehicle body or frame, according to one or more embodiments of the disclosed subject matter
Figure 6:
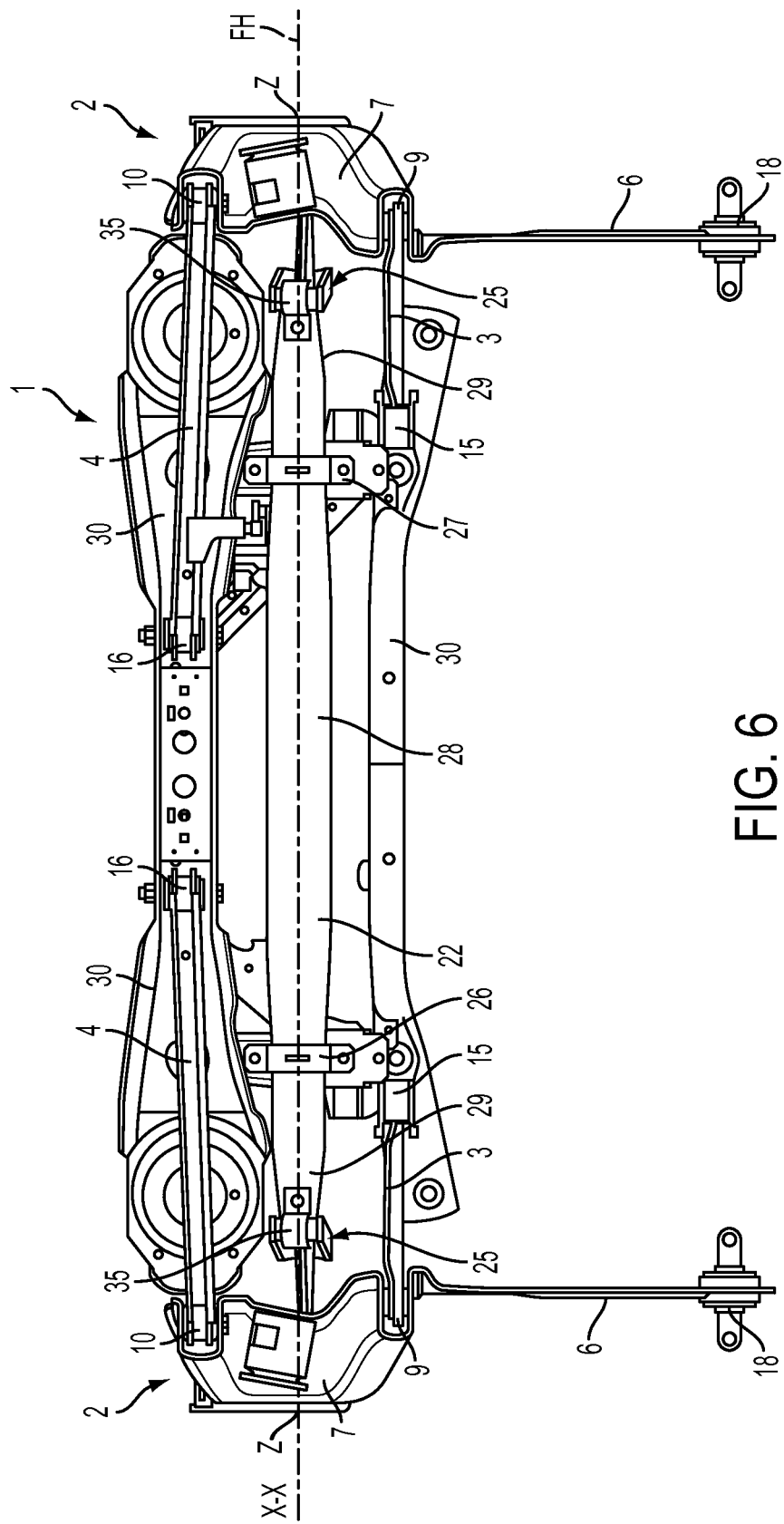

Turning to the figures, FIGS. 3-6 show various views of an exemplary embodiment of a multilink rear axle. In particular, FIGS. 3 and 4 show a wheel suspension 2 of a multilink rear axle 1, in perspective and side views, respectively. The multilink rear axle for a vehicle comprises a pair of wheel suspensions 2 arranged on opposite sides of the vehicle (i.e., a passenger-side wheel suspension and a driver-side wheel suspension). Only one of the wheel suspensions 2 is shown in FIGS. 3-4, while FIGS. 5-6 show both wheel suspensions as well as subframe 30. FIG. 5 illustrates the multilink rear axle 1 in a body-side perspective view while FIG. 6 is a perspective view from the underside of the vehicle (e.g., from below the vehicle toward the vehicle underbody).

Each wheel suspension 2 can comprise at least one lower control arm, for example, a front lower control arm 3 and a rear lower control arm 4. Each wheel suspension 2 can further comprise an upper control arm 5 and a trailing arm 6. The control arms 3, 4, 5 and the trailing arm 6 are each arranged with one of their ends on a wheel carrier or knuckle 7. A wheel (not shown) can be attached to the wheel carrier 7 via bolts 8.

The control arms 3, 4, and 5 are coupled to the wheel carrier or knuckle 7 and are capable of pivoting (e.g., rotating in a plane transverse to a longitudinal direction of the vehicle) about pivot points 12, 13 and 14 via respective bushings 9, 10, and 11. The three control arms 3, 4, and 5 extend parallel to each other and approximately parallel to a width of the vehicle, i.e., the vehicle horizontal (FH), and to the wheel axis X-X. At respective ends opposite the wheel carrier 7, the control arms 3, 4, and 5 can be coupled to the vehicle body (e.g., subframe 30 in FIGS. 5-6) via respective bushings 15, 16, and 17 that allow the control arms to pivot (e.g., rotate about the bushing in a plane transverse to the longitudinal direction of the vehicle). Although bushing 15 is not visible in FIG. 5, it would be proximal to the body-side pivot 44 of the front lower control arm 3.

The trailing arm 6 comprises an elongated plate extending away from the wheel carrier 7, for example, along the longitudinal direction toward a front of the vehicle. The trailing arm 6 has low torsional resistance and allows for flexing or bending about the vertical axis. The trailing arm 6 can be coupled to the vehicle body at an end opposite the wheel carrier via a bushing 18, which can allow trailing arm 6 to pivot (e.g., rotate about the illustrated Y-axis).

The multilink rear axle further comprises a leaf spring 22, which can be arranged between the wheel suspensions 2 and extend in the width direction of the vehicle (e.g., transverse to the direction of travel of the vehicle). The leaf spring 22 can be arranged below the upper control arm 5 and can be connected at each end to the wheel carriers 7 via at least one suspension arm 25. For example, the suspension arm 25 may connect an end of the leaf spring 22 to the upper control arm 3, as illustrated in FIG. 3. The leaf spring 22 can be connected to the suspension arm element 25 by bushings 35 arranged at respective ends of the leaf spring and which allows the leaf spring to pivot about the bushings 35 (e.g., rotate in a plane transverse to a longitudinal direction of the vehicle).

The suspension arm element 25 can comprise one or more struts 48 that are spaced from each other in the longitudinal direction of the vehicle. For example, two struts 48 can be arranged on opposite longitudinal sides of the upper control arm 5, as illustrated in FIGS. 3 and 5-6. The struts 48 of the suspension arm element 25 can be mounted on the upper control arm 5 via an additional bushing 37. For example, the additional bushing 37 may be arranged at or near the middle of the upper control arm 5, where a shoulder 38 may be formed.

For example, the upper control arm 5 can have a varying profile, with a first region 46 proximal to a body-side end of the upper control arm 5 and a second region 47 proximal to a wheel-carrier end of the upper control arm 5. The struts 48 may be coupled to bushing 37 and act on shoulder 38 in the second region 47 close to the first region 46. The first region 46 can extend from an end thereof coupled to subframe 30 and may be curved (e.g., in the form of a sickle or following a concave-up curvature). The second region 47 can extend from an end thereof coupled to contact region 45 of the wheel carrier via bushing 14. While the first region 46 can be curved, the second region 47 may adopt a substantially rectilinear profile, for example. The suspension arm element 25 can be connected to the upper control arm 5 at an interfacing region of the second region 47 proximal to the first region 46 of the upper control arm 5, e.g., via bearing bush 37 provided at the shoulder 38. Thus, the suspension arm element 25 can be arranged on the portion of the control arm 5 with the rectilinear profile, whereby corresponding forces may be easier to absorb and transfer as compared to a completely curved upper control arm (e.g., control arm 105 in FIG. 1)

Moreover, a center line of bushing 14 may be coincident with, or no more than minimally offset from, a center line A-A of the wheel carrier 7. The center line of the bushing 35 may also be coincident with, or no more than minimally offset from, the center line A-A. Thus, the abovementioned advantages of the forces oriented toward each other can be achieved.

The two struts 48 also can be coupled to bushing 35 on the leaf spring 22, i.e., at its respective end portions 29. For example, the end portions 29 of the leaf spring 22 can be tapered, e.g., having a truncated cone shape, as illustrated in FIG. 6, with struts 48 of the suspension arm element 25 connected to bushing 35 in the tapered end region. Alternatively, the leaf spring 22 and the upper control arm 5 can be connected by a single strut or more than two struts. For example, a single strut can be arranged to one side of the leaf spring and the upper control arm, which may be useful despite anticipated moments. Alternatively, it is also possible to provide a single strut 48 centrally arranged on the leaf spring 22 and the upper control arm 5 rather than off to one side.

The leaf spring 22, or at least its corresponding end portion on which a bushing 35 is disposed, can be arranged, for example, at a same vertical level or near a vertical level at which the lower control arms 3, 4 (or, their respective wheel-carrier-side bushings 9, 10 are disposed). Thus, the suspension arm element 25 may extend a vertical distance defined by pivot points 12 and 13 of the lower control arms 3 and 4 and pivot point 14 of the upper control arm 5 on the wheel carrier 7.

The rear lower control arm 4 may have a cross-section that is substantially constant along its length, in contrast to the control arm 104 of FIG. 1 where variations are necessary to accommodate the spring plate. For example, the rear lower control arm 4 may retain a substantially rectangular cross-section along its length, or at least a major portion of its length, or at least at a portion proximal to the wheel carrier 7. Such a configuration may lead to improved rigidity at a reduced weight and lower cost. As noted above, other cross-sectional shapes and cross-sectional profiles are also possible according to one or more contemplated embodiments.

The front lower control arm 3 is coupled at pivot point 12 to a wheel carrier segment 23, which is toward the front of the vehicle in relation to a line A-A that runs vertically through the wheel center point Z. The rear lower control arm 4 is coupled at pivot point 13 on a wheel carrier segment 24, which is toward the rear of the vehicle in relation in relation to the line A-A. The upper control arm 5 extends approximately parallel to wheel axis X-X and is coupled to the wheel carrier 7 at pivot point 14, which may be centered, or no more than minimally offset (e.g., offset 51) with respect to the wheel center point Z on line A-A. The wheel carrier 7 can have a contact region 45, which may be an integral part of the wheel carrier 7, where the bushing 11 is received such that the upper control arm 5 can mounted on the wheel carrier 7 and movable relative thereto.

Respective ends of leaf spring 22 can be approximately level with pivot points 12 and 13 of the lower control arms 3 and 4, below the upper control arm 5, and centrally arranged with respect to the wheel carrier 7 (i.e., between wheel carrier segments 23 and 24). In this arrangement, the leaf spring 22 replaces the anti-roll bar (e.g., 121 in FIG. 1) that would otherwise extend between the wheel suspensions in the conventional rear axle. Moreover, the force from the leaf spring 22 on the wheel carrier 7 is centered, or no more than minimally offset (e.g., offset 51), from line A-A that runs through wheel center Z by virtue of the pivoting connection to the upper control arm 5. As a result, spring forces $F_S$ generated by the leaf spring 22 and the contact force acting on the wheel body $F_W$ are vertically opposed with zero offset (or no more than minimal offset 51, as shown in FIG. 4) which reduces the vertical pre-load $F_{TB}$ acting on bushing 18 of the trailing arm 6. The durability, and hence service life, of bushing 18 can thus be increased and the NVH behavior of the rear axle improved.

FIG. 6 shows an arrangement of bearing seats 26 and 27, which are connected to subframe 30 and support the leaf spring 22. In particular, the two bearing seats 26 and 27 divide the leaf spring into a middle portion 28 (which lies between the bearing seats 26 and 27) and two end portions 29. Bushings 35 for coupling with the suspension arm element 25 can be arranged within respective end portions 29. By adjusting the position of bearing seats 26 and 27 along the length of the leaf spring 22 (i.e., along the vehicle horizontal FH) during installation, the stiffness and pretension of the leaf spring 22 can be adjusted.

Embodiments of the disclosed multilink rear axle can thus be formed without a coil spring or an anti-roll bar. Instead, their functions have been assumed by the transverse leaf spring 22 arranged below the upper control arm 5.

FIGS. 7-8 illustrate spring properties of the multilink rear axle 1 of FIGS. 3-6 during different vehicle movements, as viewed from the rear of the vehicle toward a direction of travel. In particular, FIG. 7 illustrates the form of the suspension components under a vertical suspension compression movement of the multilink rear axle 1, wherein both wheel suspensions 2 compress identically. Such vertical compression may occur, for example, when wheels of the vehicle travel over bumps, such as speed bumps or portions of a rough road.

As illustrated in FIG. 7, the wheels 31 and 32 of the vehicle are tilted slightly towards each other (i.e., camber). The suspension compression movement can cause control arms 3, 4, and 5 of the multilink rear axle 1 to tilt inward toward the middle of the vehicle, and thus would no longer be parallel to the vehicle horizontal FH or wheel axis X-X. The spring compression movement also causes the middle portion 28 of the leaf spring 22, which lies between the two bearing seats 26 and 27, to be deflected downwards i.e., bent downwards, wherein the leaf spring 22 as a whole assumes a U-shape with a local minimum (i.e., vertex 39) lying in the middle region 28 of the leaf spring 22. In contrast, in a neutral state, the leaf spring 22 may assume a rectilinear configuration, i.e., substantially flat or with middle region 28 and end regions 29 substantially parallel to each other.

FIG. 8 illustrates the form of the suspension components when the vehicle experiences a rolling movement, for example, during cornering of the vehicle. In contrast to the configuration in FIG. 7, the wheel suspensions 2 on opposite sides of the vehicle compress asymmetrically. The left wheel 31 is below the right wheel 32, which causes the wheel axis X-X to tilt by a slope angle with respect to the vehicle horizontal FH. The rolling movement of the vehicle leads to the middle portion 28 of the leaf spring 22 being tilted at an angle that approximately corresponds to the slope angle of the wheel axis X-X. However, the slope of the middle portion 28 is opposite to the slope of the wheel axis X-X. As a result of the tilting of the middle portion, the leaf spring 22 can adopt a rotated S-shape or sinusoidal shape, in which a local maximum (e.g., vertex 49) is arranged at or in a region proximal to the bearing seat 26 and a local minimum (e.g., further vertex 50) is arranged at or in a region proximal to bearing seat 27.

The rolling movement also causes control arms 3, 4, and 5 of the wheel suspension 2 for the left wheel 31 to tilt upward and toward the middle of the vehicle. Conversely, the control arms 3, 4, and 5 of the wheel suspension 2 for the right wheel 32 are tilted downward and toward the middle of the vehicle. For example, the control arms 3, 4, and 5 for both the right and left wheel suspensions 2 in the rolling configuration may have respective longitudinal axes that extend substantially or precisely parallel to the wheel axis X-X.

Figure 10:
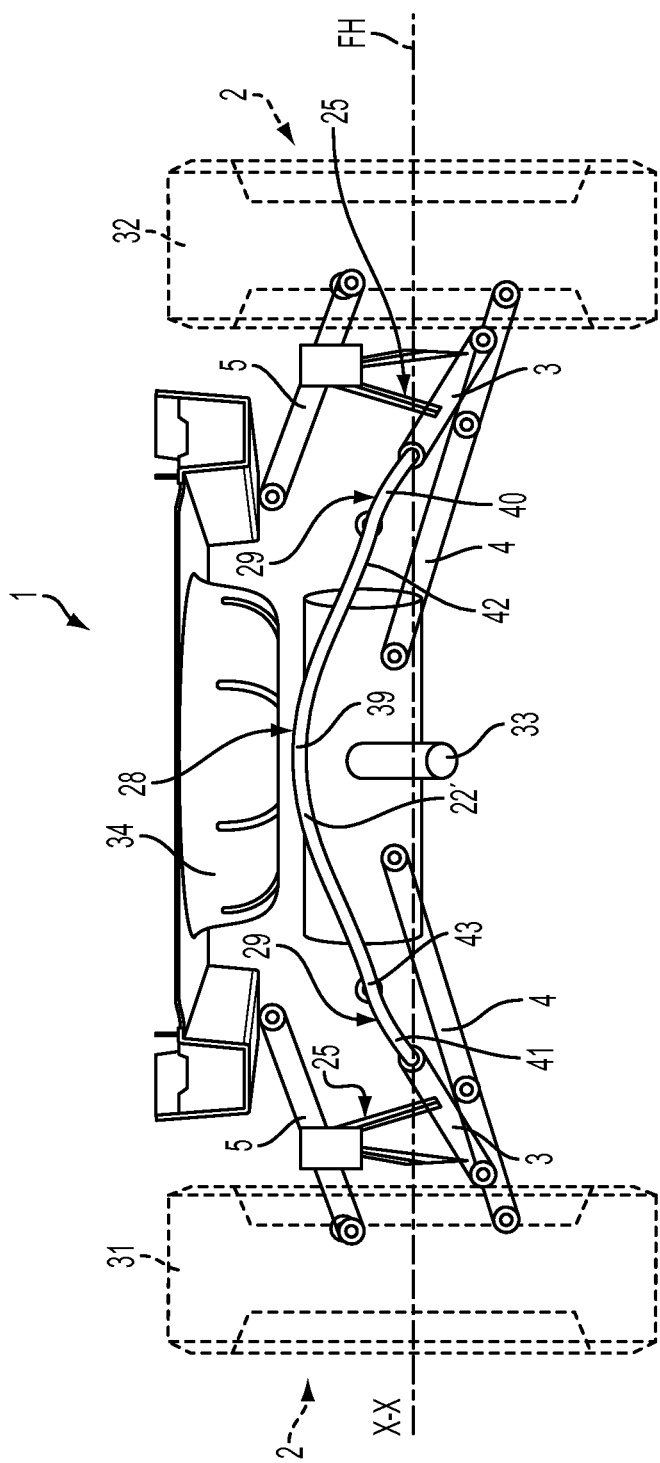
FIGS. 10-11 depict the multilink rear axle of FIG. 9 during rebound and jounce of the vehicle, respectively.
Figure 11:
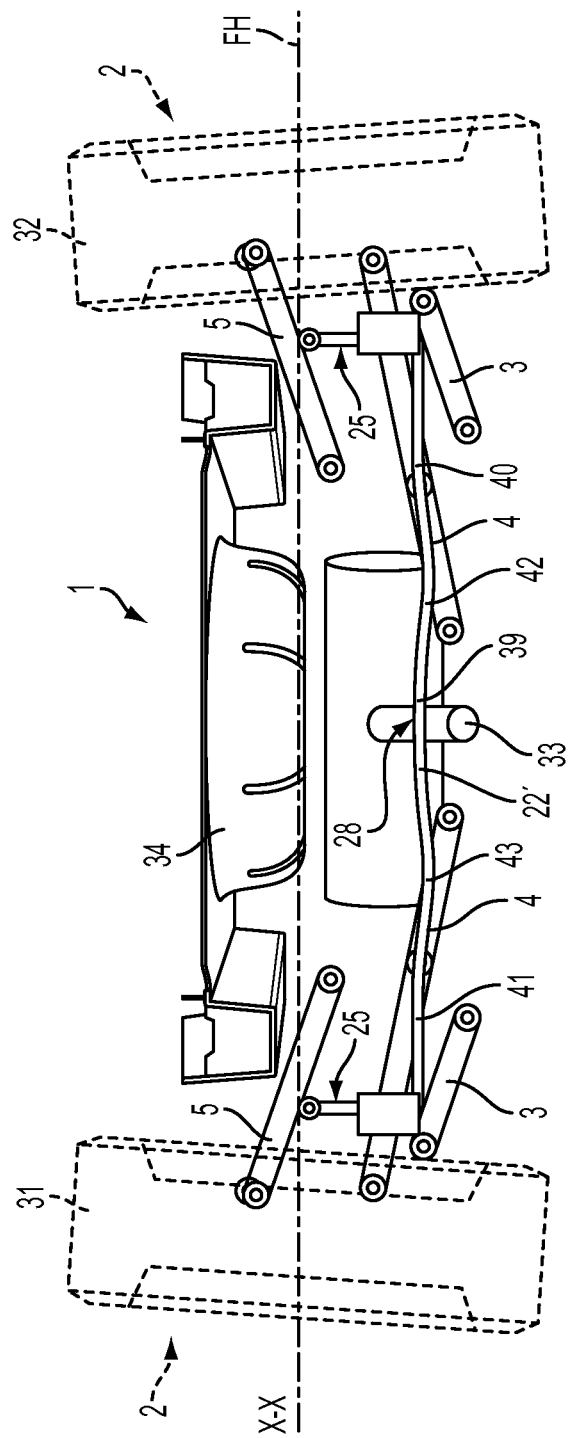

In some vehicle underbodies, there may be structures or obstructions that may interfere with operation of the leaf spring 22 illustrated in FIGS. 3-8. Accordingly, in one or more embodiments, the leaf spring can be adapted to have a profile that avoids these structures during vehicle movement. For example, FIGS. 9-11 depict another exemplary embodiment of a multilink rear axle that avoids interference with such vehicle structures. FIG. 9 illustrates the multilink rear axle in an unsprung state with a leaf spring 22' having a profile configured to avoid vehicle structures. FIGS. 10-11 illustrate spring properties of the multilink rear axle of FIG. 9 during different vehicle movements, as viewed from the rear of the vehicle toward a direction of travel. In particular, FIG. 10 illustrates the form of the suspension components during a symmetrical, suspension-extended state (e.g., rebound) while FIG. 11 illustrates the form of the suspension components during a symmetrical, suspension-compressed state (e.g., jounce) of the vehicle.

The middle portion 28 of the leaf spring 22' is pre-bent or pretensioned in a rotated C-shape or upside-down U-shape over an exhaust pipe 33. From a local maximum (e.g., vertex 39) in the middle portion 28, the leaf spring 22' slopes down on both sides toward end portions 29 down to intermediate points 42 and 43. Between intermediate points 42 and 43 and vertices 40 and 41, the leaf spring line 22' can extend with little to no slope (e.g., substantially parallel to the vehicle horizontal). Alternatively, the line of the leaf spring 22 on both sides between intermediate point 42, 43 and respective vertex 40, 41 can have a slight slope upward. From vertices 40, 41 toward their respective ends the leaf spring 22' can have a profile that slopes down again until reaching the pivot point on the upper control arm 5 or the suspension arm element 25 connected thereto.

This undulating form of leaf spring 22' provides sufficient clearance between the leaf spring 22' and, for example, exhaust pipe 33 or substructure 34 of a vehicle at all times, e.g., in the unsprung configuration of FIG. 9, in the suspension-extended configuration of FIG. 10, or in the suspension-compressed configuration of FIG. 11 The substructure 34 can be, for example, a fuel tank or a holder for a spare wheel.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the systems of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A multilink rear axle comprising:
   first and second wheel suspensions arranged on opposite sides of a vehicle, each wheel suspension comprising a wheel carrier configured to support a wheel of the vehicle thereon; and
   a leaf spring extending in a width direction of the vehicle transverse to a longitudinal direction of the vehicle, the leaf spring being coupled to the first and second wheel suspensions,
   wherein each of the wheel suspensions further comprises a first lower control arm, an upper control arm, and a trailing arm,
   wherein the control arms and the trailing arm are each arranged with respective ends on the wheel carrier,
   wherein the leaf spring is arranged below each upper control arm, and
   wherein at least one vertically extending strut couples the leaf spring to each upper control arm.

2. The multilink rear axle according to claim 1, wherein the at least one vertically extending strut is coupled to the upper control arm by a first bushing, the upper control arm is coupled to the wheel carrier by a second bushing, and the leaf spring is coupled to the at least one vertically extending strut by a third bushing.

3. The multilink rear axle according to claim 1, wherein each upper control arm is coupled to the respective wheel carrier along a vertical center line that intersects a rotational center of the wheel supported by the respective wheel carrier.

4. The multilink rear axle according to claim 1, further comprising at least two bearing seats arranged along a length of the leaf spring and configured to connect the leaf spring to a frame or subframe of the vehicle.

5. The multilink rear axle according to claim 4, wherein the at least two bearing seats are configured to be adjustable so as to adjust a pretension of the leaf spring.

6. The multilink rear axle according to claim 1, wherein the leaf spring comprises steel or a composite material.

7. The multilink rear axle according to claim 1, wherein the leaf spring has a at least one bend along its length arranged so as to avoid impact of the leaf spring with a structure of the vehicle during vertical displacement of the leaf spring.

8. The multilink rear axle according to claim 1, further comprising a second lower control arm, wherein one of the first and second lower control arms is arranged with its respective end on a front half of the wheel carrier, and the other of the first and second lower control arms is arranged with its respective end on a rear half of the wheel carrier.

9. The multilink rear axle according to claim 1, further comprising:
   first bushings that couple ends of the leaf spring to the respective vertically extending struts; and
   second bushings that couple the first lower control arms to the respective wheel carrier,
   wherein the first and second bushings are arranged at a same level in a vertical direction.

10. The multilink rear axle according to claim 1, wherein each upper control arm comprises:

a first region configured to connect at an end thereof to a frame or subframe of the vehicle via a respective third bush bearing and having a concave-up curved profile along its length; and a second region connected at an end thereof to the respective wheel carrier via a respective fourth bush bearing and having a rectilinear profile along its length, wherein each at least one vertically extending strut is coupled to the respective upper control arm by a fifth bush bearing arranged in the second region proximal to the first region.

11. The multilink rear axle according to claim 1, wherein the leaf spring is arranged between the first and second wheel suspensions so as to provide a spring force to each wheel suspension and to provide a function of an anti-roll bar.

12. The multilink rear axle according to claim 1, further comprising a second lower control arm arranged with its respective end on a rear half of the wheel carrier, wherein the second lower control arm has a constant rectangular cross-section over a major portion of its length.

13. The multilink rear axle according to claim 1, wherein the leaf spring is configured to adopt a U-shape in profile when the vehicle is subjected to vertical motion and a sinusoidal shape in profile when the vehicle is subjected to roll.

14. The multilink rear axle according to claim 1, wherein, for each wheel suspension, a rotational axis of the wheel supported by the respective wheel carrier and an attachment point of the respective upper control arm to the respective wheel carrier are offset from each other in the longitudinal direction of the vehicle by an amount not exceeding 100 mm.

15. A multilink rear axle comprising:
a wheel carrier for rotatably supporting a wheel of the vehicle, the supported wheel having a rotation axis;
a leaf spring extending in a width direction of the vehicle that is transverse to a longitudinal direction of the vehicle;
a first lower control arm extending in the width direction and pivotably coupled to the wheel carrier at a rear half thereof;
an upper control arm extending in the width direction and pivotably coupled to the wheel carrier at an attachment point that is offset from the rotation axis in the longitudinal direction by less than or equal to 100 mm; and
at least one member pivotably coupling the leaf spring to the upper control arm.

16. The multilink rear axle according to claim 15, further comprising a trailing arm extending in the longitudinal direction and coupled to the wheel carrier at a front half thereof.

17. The multilink rear axle according to claim 15, wherein the first lower control arm has a cross section that is substantially rectangular over a major portion of its length proximal to the wheel carrier.

18. The multilink rear axle according to claim 15, wherein the upper control arm is positioned over the leaf spring and higher than the first lower control arm in a vertical direction.

19. The multilink rear axle according to claim 15, wherein the at least one member is attached to the upper control arm proximal to a region where the upper control arm changes from a rectilinear profile to a curved profile.

20. The multilink rear axle according to claim 15, further comprising at least one bearing seat configured to couple the leaf spring to the vehicle or frame thereof.

21. A trailing arm rear axle comprising:
a wheel carrier;
an upper control arm, front and rear lower control arms, and a trailing arm, each arm being coupled to a portion of the wheel carrier;
and
a leaf spring coupled to the upper control arm and extending in a width direction of a vehicle.

22. The trailing arm rear axle according to claim 21, wherein the spring element is coupled to the upper control arm by one or more vertically extending struts.

23. A trailing arm rear axle comprising:
a wheel carrier;
an upper control arm, front and rear lower control arms, and a trailing arm, each arm coupled to a portion of the wheel carrier; and
a spring element coupled to the upper control arm;
wherein the upper control arm is coupled to the wheel carrier at a point offset, in a longitudinal direction of the vehicle, from a rotational axis of a wheel supported by the wheel carrier by an amount not exceeding 100 mm.

* * * * *